(12) United States Patent
Mishra et al.

(10) Patent No.: US 10,616,349 B2
(45) Date of Patent: Apr. 7, 2020

(54) HYBRID SENSOR CENTRIC RECOMMENDATION ENGINE

(71) Applicant: MICROSOFT TECHNOLOGY LICENSING, LLC, Redmond, WA (US)

(72) Inventors: Abhineet Mishra, Bothell, WA (US); Venkata Madhu Sravanth Kurumaddali, Redmond, WA (US); Rashi Anand, Hyderabad (IN)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 15/967,691

(22) Filed: May 1, 2018

(65) Prior Publication Data

US 2019/0342401 A1 Nov. 7, 2019

(51) Int. Cl.
*H04L 29/08* (2006.01)

(52) U.S. Cl.
CPC .............. *H04L 67/16* (2013.01); *H04L 67/12* (2013.01); *H04L 67/306* (2013.01)

(58) Field of Classification Search
CPC ....... H04W 4/02; H04W 64/00; H04W 84/18; H04L 29/08657; H04L 29/08108; H04L 29/08936; G01S 5/0252; G01S 5/02; G01S 5/14; H04M 1/72572; H04M 1/7253; H04M 1/6066; H04M 1/6041; H04M 1/6091; H04M 1/6075; G01C 21/20; G06K 19/0723; G06K 7/0008; B60R 11/0241; H04B 1/3877

USPC ................. 455/456.1–456.3, 575.9
See application file for complete search history.

(56) References Cited

U.S. PATENT DOCUMENTS

| | | |
|---|---|---|
| 4,398,720 A | 8/1983 | Jones et al. |
| 4,591,710 A | 5/1986 | Komadina et al. |
| 4,672,154 A | 6/1987 | Rodgers et al. |
| 4,686,332 A | 8/1987 | Greanias et al. |
| 4,707,845 A | 11/1987 | Krein et al. |
| 4,791,592 A | 12/1988 | Burgess |

(Continued)

FOREIGN PATENT DOCUMENTS

| | | |
|---|---|---|
| CN | 202092590 U | 12/2011 |
| CN | 103576997 A | 2/2014 |

(Continued)

OTHER PUBLICATIONS

"International Search Report and Written Opinion Issued in PCT Application No. PCT/US2019/020463", dated Apr. 18, 2019, 13 Pages.

(Continued)

*Primary Examiner* — Dai Phuong

(57) ABSTRACT

Techniques for providing a recommendation engine for personal digital assistant functionality on hardware devices. In an aspect, sensor data and other signals for a user are collected and processed to extract user patterns. A user profile is further constructed using machine learning techniques. The insights obtained from the user patterns and user profile are combined by digital service routines to generate customized recommendations for users. In a further aspect, user feedback may be utilized to improve the accuracy and relevance of the recommendations.

20 Claims, 10 Drawing Sheets

(56) References Cited

U.S. PATENT DOCUMENTS

| | | |
|---|---|---|
| 4,977,397 A | 12/1990 | Kuo et al. |
| 5,117,071 A | 5/1992 | Greanias et al. |
| 5,129,654 A | 7/1992 | Bogner |
| 5,239,139 A | 8/1993 | Zuta |
| 5,528,002 A | 6/1996 | Katabami |
| 5,543,588 A | 8/1996 | Bisset et al. |
| 5,574,262 A | 11/1996 | Petty |
| 5,691,512 A | 11/1997 | Obi |
| 5,825,345 A | 10/1998 | Takahama et al. |
| 5,831,600 A | 11/1998 | Inoue et al. |
| 5,841,078 A | 11/1998 | Miller et al. |
| 5,854,881 A | 12/1998 | Yoshida et al. |
| 5,859,392 A | 1/1999 | Petty |
| 5,889,511 A | 3/1999 | Ong et al. |
| 5,905,489 A | 5/1999 | Takahama et al. |
| 5,923,320 A | 7/1999 | Murakami et al. |
| 5,973,676 A | 10/1999 | Kawakura |
| 6,020,849 A | 2/2000 | Fukuzaki |
| 6,081,259 A | 6/2000 | Teterwak |
| 6,229,529 B1 | 5/2001 | Yano et al. |
| 6,239,389 B1 | 5/2001 | Allen et al. |
| 6,417,846 B1 | 7/2002 | Lee |
| 6,459,424 B1 | 10/2002 | Resman |
| 6,690,156 B1 | 2/2004 | Weiner et al. |
| 6,888,536 B2 | 5/2005 | Westerman et al. |
| 7,244,901 B1 | 7/2007 | Liao et al. |
| 7,248,249 B2 | 7/2007 | Kong et al. |
| 7,292,229 B2 | 11/2007 | Morag et al. |
| 7,372,455 B2 | 5/2008 | Perski et al. |
| 7,656,396 B2 | 2/2010 | Bosch et al. |
| 7,725,089 B2 | 5/2010 | Lee et al. |
| 7,843,439 B2 | 11/2010 | Perski et al. |
| 7,868,874 B2 | 1/2011 | Reynolds |
| 7,995,036 B2 | 8/2011 | Perski et al. |
| 8,059,102 B2 | 11/2011 | Rimon et al. |
| 8,278,571 B2 | 10/2012 | Orsley |
| 8,289,289 B2 | 10/2012 | Rimon et al. |
| 8,305,358 B2 | 11/2012 | Klinghult et al. |
| 8,402,391 B1 | 3/2013 | Doray et al. |
| 8,420,958 B2 | 4/2013 | Lu et al. |
| 8,482,545 B2 | 7/2013 | King-Smith et al. |
| 8,542,210 B2 | 9/2013 | Westerman |
| 8,633,718 B2 | 1/2014 | Yeh et al. |
| 8,660,978 B2 | 2/2014 | Hinckley et al. |
| 8,810,542 B2 | 8/2014 | Yousefpor |
| 8,994,692 B2 | 3/2015 | Yumoto et al. |
| 9,110,543 B1 | 8/2015 | Dabell |
| 9,262,010 B2 | 2/2016 | Bulea |
| 9,367,168 B2 | 6/2016 | Ahn et al. |
| 9,495,052 B2 | 11/2016 | Shepelev |
| 9,626,020 B2 | 4/2017 | Durojaiye et al. |
| 9,632,622 B2 | 4/2017 | Hotelling et al. |
| 9,823,774 B2 | 11/2017 | Winebrand |
| 10,025,403 B2 | 7/2018 | Haran et al. |
| 2002/0089491 A1 | 7/2002 | Willig |
| 2003/0080946 A1 | 5/2003 | Chuang |
| 2004/0027340 A1 | 2/2004 | Muraoka et al. |
| 2004/0100450 A1 | 5/2004 | Choi |
| 2004/0155871 A1 | 8/2004 | Perski et al. |
| 2004/0160426 A1 | 8/2004 | Degroot et al. |
| 2004/0178995 A1 | 9/2004 | Sterling |
| 2005/0189154 A1 | 9/2005 | Perski et al. |
| 2005/0271259 A1 | 12/2005 | Lorch et al. |
| 2006/0012580 A1 | 1/2006 | Perski et al. |
| 2006/0017709 A1 | 1/2006 | Okano |
| 2006/0097991 A1 | 5/2006 | Hotelling et al. |
| 2006/0109252 A1 | 5/2006 | Kolmykov-zotov et al. |
| 2006/0139339 A1 | 6/2006 | Pechman et al. |
| 2007/0038616 A1 | 2/2007 | Guha |
| 2007/0152976 A1 | 7/2007 | Townsend et al. |
| 2007/0285404 A1 | 12/2007 | Rimon et al. |
| 2008/0012835 A1 | 1/2008 | Rimon et al. |
| 2008/0012838 A1 | 1/2008 | Rimon |
| 2008/0128180 A1 | 6/2008 | Perski et al. |
| 2008/0238885 A1 | 10/2008 | Zachut et al. |
| 2009/0020343 A1 | 1/2009 | Rothkopf et al. |
| 2009/0094223 A1 | 4/2009 | Berk et al. |
| 2009/0095540 A1 | 4/2009 | Zachut et al. |
| 2009/0160787 A1 | 6/2009 | Westerman et al. |
| 2009/0251434 A1 | 10/2009 | Rimon et al. |
| 2010/0060608 A1 | 3/2010 | Yousefpor |
| 2010/0155153 A1 | 6/2010 | Zachut |
| 2010/0156851 A1 | 6/2010 | Kurokawa |
| 2010/0289752 A1 | 11/2010 | Birkler |
| 2010/0321338 A1 | 12/2010 | Ely |
| 2011/0012840 A1 | 1/2011 | Hotelling et al. |
| 2011/0012855 A1 | 1/2011 | Yeh et al. |
| 2011/0084929 A1 | 4/2011 | Chang et al. |
| 2011/0155479 A1 | 6/2011 | Oda et al. |
| 2011/0175835 A1 | 7/2011 | Wang |
| 2011/0254802 A1 | 10/2011 | Philipp |
| 2011/0254807 A1 | 10/2011 | Perski et al. |
| 2011/0284632 A1 | 11/2011 | Mullen et al. |
| 2011/0291944 A1 | 12/2011 | Simmons et al. |
| 2011/0310040 A1 | 12/2011 | Ben-shalom et al. |
| 2012/0013555 A1 | 1/2012 | Maeda et al. |
| 2012/0050180 A1 | 3/2012 | King et al. |
| 2012/0068964 A1 | 3/2012 | Wright et al. |
| 2012/0105362 A1 | 5/2012 | Kremin et al. |
| 2012/0133616 A1 | 5/2012 | Nishihara et al. |
| 2012/0158629 A1 | 6/2012 | Hinckley et al. |
| 2012/0182238 A1 | 7/2012 | Lee |
| 2012/0197911 A1 | 8/2012 | Banka et al. |
| 2012/0249457 A1 | 10/2012 | Chou et al. |
| 2012/0262411 A1 | 10/2012 | Ahn et al. |
| 2013/0009896 A1 | 1/2013 | Zaliva |
| 2013/0009907 A1 | 1/2013 | Rosenberg et al. |
| 2013/0027361 A1 | 1/2013 | Perski et al. |
| 2013/0127757 A1 | 5/2013 | Mann et al. |
| 2013/0132903 A1 | 5/2013 | Krishnaswamy |
| 2013/0176280 A1 | 7/2013 | Wu et al. |
| 2013/0198694 A1* | 8/2013 | Rahman ............... G06F 3/0484 715/864 |
| 2013/0249950 A1 | 9/2013 | Mahmoud et al. |
| 2013/0265258 A1 | 10/2013 | Garfinkel et al. |
| 2013/0278543 A1 | 10/2013 | Hsu et al. |
| 2013/0285973 A1 | 10/2013 | Elias et al. |
| 2013/0298642 A1* | 11/2013 | Gillette, II ........ E21B 47/0006 73/31.01 |
| 2013/0300672 A1 | 11/2013 | Griffin |
| 2013/0300696 A1 | 11/2013 | Haran et al. |
| 2013/0328832 A1 | 12/2013 | Boumgarten |
| 2014/0099971 A1* | 4/2014 | Lim ..................... G01S 5/0027 455/456.1 |
| 2014/0152620 A1 | 6/2014 | Perski et al. |
| 2014/0168116 A1 | 6/2014 | Sasselli et al. |
| 2014/0320445 A1 | 10/2014 | Kim |
| 2015/0019342 A1 | 1/2015 | Gupta |
| 2015/0049044 A1 | 2/2015 | Yousefpor et al. |
| 2015/0070310 A1 | 3/2015 | Suzuki et al. |
| 2015/0109243 A1 | 4/2015 | Jun et al. |
| 2015/0112801 A1 | 4/2015 | Nice et al. |
| 2015/0133164 A1* | 5/2015 | Song ..................... G06Q 10/10 455/456.3 |
| 2015/0177089 A1 | 6/2015 | Ferran et al. |
| 2015/0193025 A1 | 7/2015 | Rebeschi et al. |
| 2015/0363067 A1 | 12/2015 | Winebrand |
| 2015/0379400 A1* | 12/2015 | Tatourian ............. H04L 67/22 706/46 |
| 2016/0041685 A1 | 2/2016 | Perski et al. |
| 2016/0054831 A1 | 2/2016 | Tsai et al. |
| 2016/0098742 A1 | 4/2016 | Minicucci et al. |
| 2016/0142884 A1* | 5/2016 | Sears .................. H04W 40/244 455/404.2 |
| 2016/0157062 A1* | 6/2016 | Shim .................... G06N 5/04 455/456.3 |
| 2016/0183060 A1* | 6/2016 | Seyde ................. H04W 4/029 455/456.3 |
| 2016/0209063 A1* | 7/2016 | Fang ..................... F24F 11/30 |
| 2016/0216794 A1 | 7/2016 | Yoon et al. |
| 2016/0266673 A1 | 9/2016 | Dinu et al. |
| 2016/0274700 A1 | 9/2016 | Mishalov |
| 2017/0177138 A1 | 6/2017 | Orlovsky et al. |

(56) References Cited

U.S. PATENT DOCUMENTS

| | | | |
|---|---|---|---|
| 2017/0255282 A1 | 9/2017 | Winebrand et al. | |
| 2018/0061271 A1* | 3/2018 | Mohammed | G06F 3/014 |
| 2018/0113523 A1 | 4/2018 | Hara et al. | |
| 2019/0266266 A1 | 8/2019 | Mishra et al. | |
| 2019/0278388 A1 | 9/2019 | Barel et al. | |
| 2019/0318037 A1 | 10/2019 | Mishra et al. | |
| 2019/0347358 A1 | 11/2019 | Mishra et al. | |

FOREIGN PATENT DOCUMENTS

| | | |
|---|---|---|
| EP | 0684580 A2 | 11/1995 |
| EP | 1422601 A1 | 5/2004 |
| EP | 1717677 A2 | 11/2006 |
| EP | 2659832 A1 | 11/2013 |
| EP | 3131040 A1 | 2/2017 |
| JP | 05173698 A | 7/1993 |
| JP | 07311647 A | 11/1995 |
| JP | 09325852 A | 12/1997 |
| JP | 10031545 A | 2/1998 |
| JP | 2002207563 A | 7/2002 |
| TW | 201537442 A | 10/2015 |
| WO | 03019346 A1 | 3/2003 |
| WO | 2005081631 A2 | 9/2005 |
| WO | 2009108334 A2 | 9/2009 |
| WO | 2011154950 A1 | 12/2011 |
| WO | 2012111010 A1 | 8/2012 |
| WO | 2012140656 A1 | 10/2012 |
| WO | 2013171747 A2 | 11/2013 |
| WO | 2014145872 A1 | 9/2014 |
| WO | 2015006312 A2 | 1/2015 |
| WO | 2017023557 A1 | 2/2017 |
| WO | 2017130002 A1 | 8/2017 |

OTHER PUBLICATIONS

"International Search Report and Written Opinion Issued in PCT Patent Application No. PCT/US2019/027572", dated Jul. 2, 2019, 12 Pages.
"International Search Report and Written Opinion Issued in PCT Patent Application No. PCT/US2019/029533", dated Jul. 4, 2019, 10 Pages.
"Non Final Office Action Issued in U.S. Appl. No. 15/917,865", dated Aug. 19, 2019, 8 Pages.
"AN11623 LPC82x Touch Solution Hardware Design Guide", Retrieved From: https://www.mouser.com/pdfdocs/NXPLPC82xTouchSolutionHardwareDesignGuide.PDF, Dec. 22, 2014, 18 Pages.
"Capacitive Sensing Solutions from Silicon Labs", Retrieved From: https://web.archive.org/web/20140831110204/http://www.silabs.com/Support%20Documents/TechnicalDocs/CapacitiveTouchSenseTechnologySPKR.pdf, Aug. 31, 2014, 53 Pages.
"MTI Instruments Capacitance Measurement Products", Retrieved From: http://www.mtiinstruments.com/technology/Capacitance.aspx, Retrieved on: Jul. 16, 2015, 9 Pages.
"Office Action Issued in European Patent Application No. 05709125.8.", dated Nov. 22, 2013, 4 Pages.
"Office Action Issued in European Patent Application No. 05709125.8", dated Jun. 20, 2013, 4 Pages.
"Office Action Issued in European Patent Application No. 05709125.8", dated Jul. 19, 2012, 4 Pages.
"Office Action Issued in European Patent Application No. 05709125.8", dated May 15, 2014, 5 Pages.
"Office Action Issued in European Patent Application No. 05709125.8", dated Nov. 13, 2012, 7 Pages.
"Summons to Attend Oral Hearing Issued in European Patent Application No. 05709125.8", dated Dec. 15, 2014, 8 Pages.
"Supplementary Search Report Issued in European Patent Application No. 05709125.8", dated Mar. 27, 2012, 3 Pages.
"Non Final Office Action Issued in U.S. Appl. No. 11/063,535", dated May 27, 2009, 23 Pages.
"Non Final Office Action Issued in U.S. Appl. No. 11/063,535", dated May 25, 2010, 30 Pages.
"Final Office Action Issued in U.S. Appl. No. 11/063,535.", dated Dec. 22, 2010, 15 Pages.
"Final Office Action Issued in U.S. Appl. No. 11/063,535.", dated Dec. 8, 2009, 29 Pages.
"Final Office Action Issued in U.S. Appl. No. 13/171,601", dated Jun. 5, 2012, 25 Pages.
"Non Final Office Action Issued in U.S. Appl. No. 13/171,601.", dated Nov. 15, 2011, 19 Pages.
"Non Final Office Action Issued in U.S. Appl. No. 13/644,331.", dated Mar. 28, 2013, 22 Pages.
"Final Office Action Issued in U.S. Appl. No. 13/892,381", dated Jun. 14, 2017, 18 Pages.
"Final Office Action Issued in U.S. Appl. No. 13/892,381.", dated Jul. 8, 2016, 22 Pages.
"Final Office Action Issued in U.S. Appl. No. 13/892,381", dated Oct. 5, 2015, 25 Pages.
"Non Final Office Action Issued in U.S. Appl. No. 13/892,381", dated Jan. 13, 2016, 20 Pages.
"Non Final office Action Issued in U.S. Appl. No. 13/892,381", dated Dec. 30, 2016, 18 Pages.
"Non Final Office Action Issued in U.S. Appl. No. 13/892,381.", dated Mar. 18, 2015, 20 Pages.
"Final Office Action Issued in U.S. Appl. No. 14/977,721", dated Nov. 30, 2017, 17 Pages.
"Final Office Action Issued in U.S. Appl. No. 14/977,721", dated Nov. 8, 2018, 18 Pages.
"Non Final Office Action Issued in U.S. Appl. No. 14/977,721", dated Jun. 2, 2017, 14 Pages.
"Final Office Action Issued in U.S. Appl. No. 14/977,766", dated Oct. 27, 2017, 14 Pages.
"Non Final Office Action Issued in U.S. Appl. No. 14/977,766", dated Jun. 1, 2017, 11Pages.
"Non Final Office Action Issued in U.S. Appl. No. 14/977,766", dated Feb. 16, 2018, 15 Pages.
"Non Final Office Action Issued in U.S. Appl. No. 14/977,721", dated Apr. 5, 2018, 17 Pages.
"Non Final Office Action Issued in U.S. Appl. No. 15/050,656", dated Apr. 3, 2017, 9 Pages.
"Non Final Office Action Issued in U.S. Appl. No. 15/070,380", dated Jan. 11, 2018, 14 Pages.
"International Search Report and Written Opinion Issued in PCT Application No. PCT/US19/018445", dated Apr. 25, 2019, 12 Pages.
"International Search Report and Written Opinion Issued in PCT Application No. PCT/US2019/024189", dated May 16, 2019, 17 Pages.
"Office Action Issued in Japanese Patent Application No. 2007500353", dated May 21, 2010, 8 Pages.
"Office Action Issued in Japanese Patent Application No. 2007-500353", dated Jun. 2, 2011, 4 Pages.
Allan, Roger, "How to Select the Right Touch Sensing Approach for Your Design", Retrieved From: http://www.digikey.com/es/articles/techzone/2011/aug/how-to-select-the-right-touch-sensing-approach-for-your-design, Aug. 25, 2011, 4 Pages.
Camacho, et al., "Designing Touch Sensing Electrodes: Electrical Considerations and Recommended Layout Patterns", In the Book of Designing Touch Sensing Electrodes: Electrical Considerations and Recommended Layout Patterns, Published by Citeseer, Jul. 2011, 28 Pages.
Harrison, et al., "Capacitive Fingerprinting: Exploring User Differentiation by Sensing Electrical Properties of the Human Body", In Proceedings of the 25th annual ACM symposium on User Interface Software and Technology, Oct. 7, 2012, pp. 537-544.
Hughes, Neil, "Apple's Stylus Receiver Concept Would Improve the Precision of Digital Pen-Based Input", Retrieved from: https://appleinsider.com/articles/15/01/29/apples-stylus-receiver-concept-would-improve-the-prevision-of-digital-pen-based-input ,Jan. 29, 2015, 9 Pages.

(56) References Cited

OTHER PUBLICATIONS

Park, et al., "A Pen-Pressure-Sensitive Capacitive Touch System Using Electrically Coupled Resonance Pen", In the International Journal of IEEE on Solid-State Circuits, vol. 51, Issue 1, Jan. 2016, pp. 168-176.
"International Search Report and Written Opinion Issued in Patent Application No. PCT/IL05/00229", dated May 23, 2006, 8 Pages.
"Invitation to pay additional fees Issued in PCT Application No. PCT/IL2013/050417", dated Sep. 4, 2013, 6 Pages.
"International Search Report & Written Opinion Issued in PCT Application No. PCT/IL2013/050417", dated Dec. 20, 2013, 20 Pages.
"International Preliminary Report on Patentability Issued in PCT Application No. PCT/US2016/022760", dated Jun. 6, 2017, 16 Pages.
"International Search Report & Written Opinion Issued in PCT Application No. PCT/US2016/022760", dated Jun. 3, 2016, 14 Pages.
"Second Written Opinion Issued in PCT Application No. PCT/US2016/022760", dated Feb. 1, 2017, 8 Pages.
"International Search Report and Written Opinion Issued in PCT Application No. PCT/US2016/066737", dated Apr. 11, 2017, 12 Pages.
Wang, et al., "Detecting and Leveraging Finger Orientation for Interaction with Direct-Touch Surfaces", In Proceedings of the 22nd annual ACM symposium on User interface software and technology, Oct. 4, 2009, pp. 23-32.
Rizzo, et al., "NERD: A Framework for Unifying Named Entity Recognition and Disambiguation Extraction Tools", In Proceedings of the 13th Conference of the European Chapter of the Association for Computational Linguistics, Apr. 23, 2012, pp. 73-76.

\* cited by examiner

HYBRID SENSOR CENTRIC RECOMMENDATION ENGINE

BACKGROUND

With the advent of always-on ubiquitous wireless connectivity, people are continuously generating ever-increasing amounts of personal data. For example, devices such as smartphones, smart watches, and wireless sensors collect data such as users' location history, Internet browsing history, conversations with digital assistants, books browsed and read, vital statistics as monitored by fitness bands, etc. As various data streams from such devices proliferate, it becomes increasingly challenging to mine the data effectively to generate personal insights about users, and to utilize those insights to serve users in more customized and relevant ways.

It would be desirable to provide novel and effective techniques for extracting actionable insights about users from various data streams, and to design a personal digital assistant that utilizes the insights to generate customized, relevant recommendations for users.

DETAILED DESCRIPTION

Various aspects of the technology described herein are generally directed towards techniques for providing a recommendation engine for personal digital assistants (PDA's) executed on hardware devices. In an aspect, sensor data and other signals for a user are collected and processed to extract user patterns. A user profile is further constructed for each user using machine learning techniques. The insights obtained from the user patterns and user profile are combined by digital service routines to generate customized recommendations for users. The digital service routines may be programmed using an application programming interface (API), and executed by a PDA either remotely or locally on the device. In a further aspect, user feedback may be utilized to improve the accuracy and relevance of the recommendations.

The detailed description set forth below in connection with the appended drawings is intended as a description of exemplary means "serving as an example, instance, or illustration," and should not necessarily be construed as preferred or advantageous over other exemplary aspects. The detailed description includes specific details for the purpose of providing a thorough understanding of the exemplary aspects of the invention. It will be apparent to those skilled in the art that the exemplary aspects of the invention may be practiced without these specific details. In some instances, well-known structures and devices are shown in block diagram form in order to avoid obscuring the novelty of the exemplary aspects presented herein.

Figure 1:
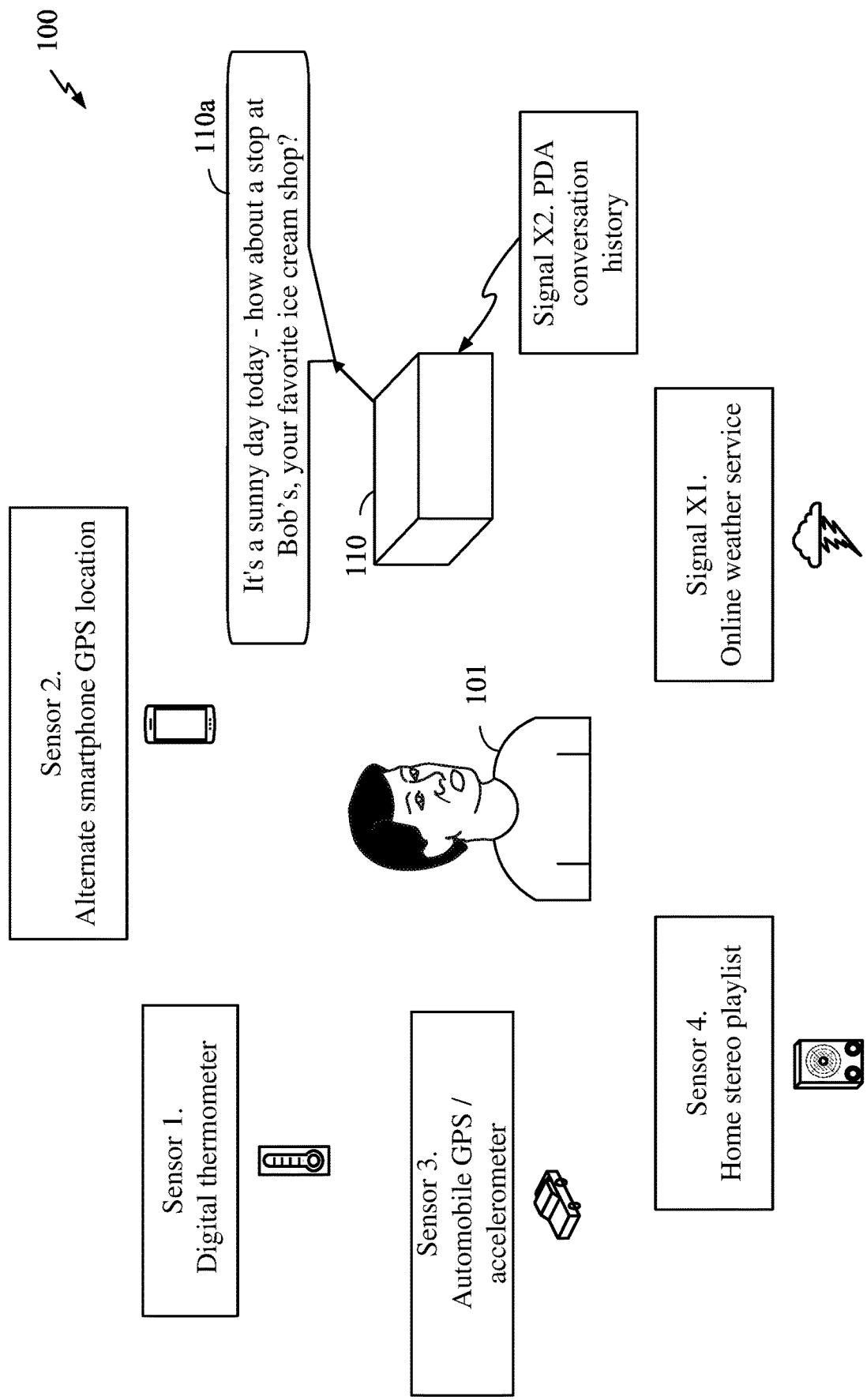
FIG. 1 shows an illustrative application of techniques of the present disclosure.

FIG. 1 shows an illustrative application 100 of techniques of the present disclosure. Note FIG. 1 is shown for illustrative purposes only, and is not meant to limit the scope of the present disclosure to any particular types of sensors, signals, digital assistant devices, recommendations, or interaction modalities.

In FIG. 1, user 101 interacts directly with a personal digital assistant (PDA) or virtual assistant (VA), whose functionality is executed by device 110. Supported modes of interaction with the assistant may include, e.g., voice/speech communications using natural language processing, text or graphical entry with visual display, gesture recognition, etc. In an exemplary embodiment, device 110 may be any hardware device, e.g., mobile devices such as smartphones, smart watches, tablets, laptop computers, etc., or other devices such as desktop computers, independent or stand-alone dedicated personal digital assistant devices, virtual assistant devices, automotive personal assistants, smart appliances, smart speakers, etc. Device 110 may be configured to provide various other functional services to user 101, such as cellular connectivity and/or Internet access, in addition to personal digital assistant (PDA) functionality further described hereinbelow. In an exemplary embodiment, the PDA may correspond to, e.g., Microsoft Cortana, as executed on any of a variety of hardware devices.

The PDA may provide services specifically customized to the user and the user's characteristics. For example, a PDA may provide personalized activity recommendations based on the user's specific time schedule and/or personal activity preferences. The PDA may further interact with the user in a customized manner, e.g., using user-specific vocabulary or speech accents, etc.

To customize its services, the PDA may draw on a variety of information sources about the user. For example, the PDA may utilize explicit user input (e.g., explicit specification by the user of items such as hobbies, scheduled tasks, preferred activities, etc.), statistics on the usage of device 110 (e.g., time and duration of device usage, applications accessed, etc.), as well as data collected from a variety of sensors.

FIG. 1 shows an exemplary variety of sensors and signals that may be used for service customization by the PDA. Note the sensors and signals are shown for illustrative purposes only, and are not meant to limit the scope of the present disclosure to any particular sensors or signals shown. The sensors and signals shown may be independent of device 110, and operatively coupled to device 110 via one or more wireless or wired network connections (not shown in FIG. 1).

Figure 10:
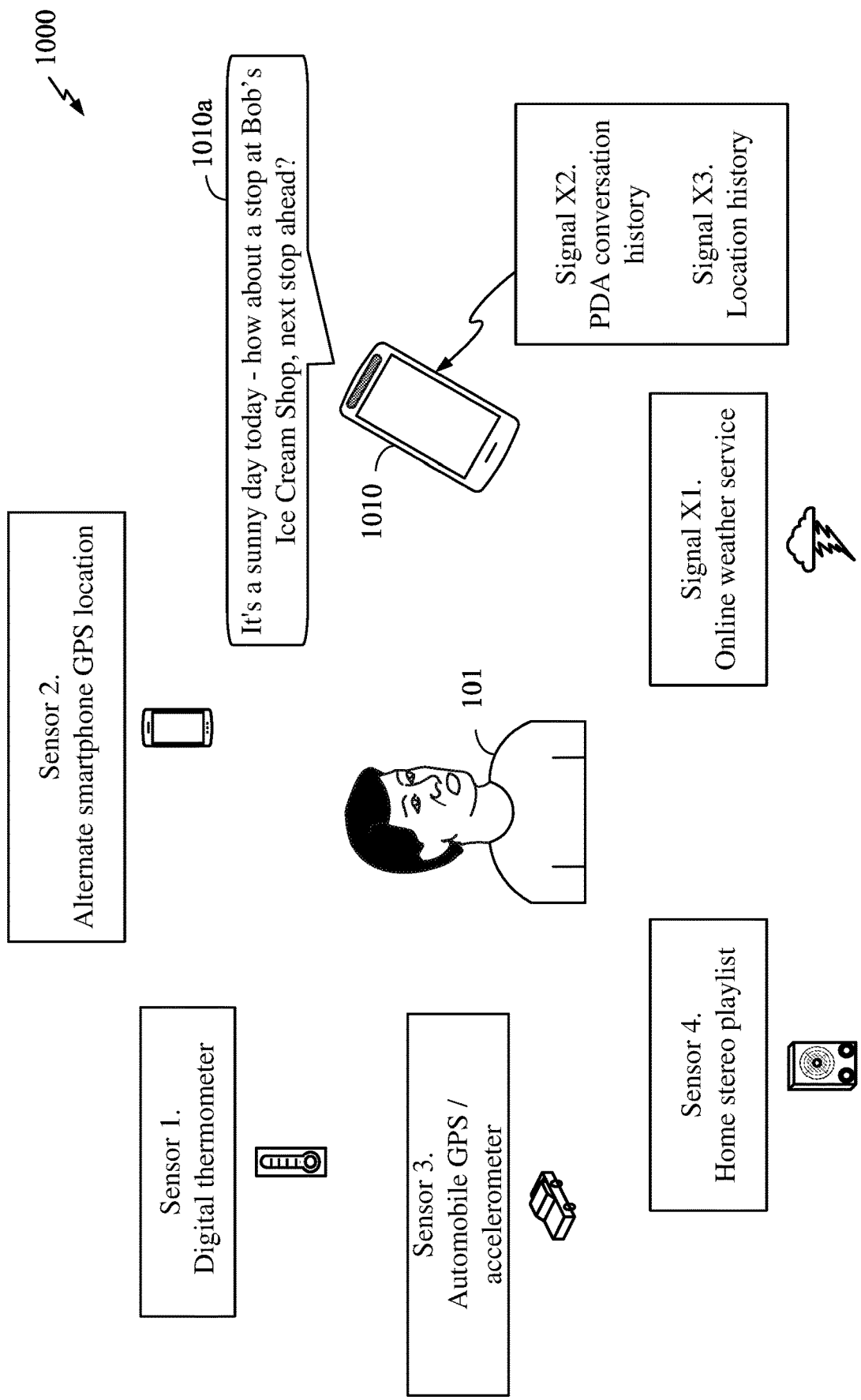
FIG. 10 illustrates an alternative exemplary embodiment of a smartphone device supporting a PDA.

In particular, Sensor 1 is a digital thermometer, which may periodically measure and communicate ambient temperatures as measured at a time and particular locale. Sensor 2 is a GPS location sensor for an alternate smartphone, e.g., a smartphone other than device 110 belonging to user 101. Sensor 3 is an automobile GPS/accelerometer unit, which may measure and communicate the position and travel speed of the user's automobile. Sensor 4 is a home stereo digital playlist, which may indicate titles, performers, durations, times of playback, etc., of musical selections played on the user's home stereo system. Signal X1 is an online weather service supplying data on local current weather and/or weather forecasts. Signal X2 is data provided by device 110 itself, indicating records of previous conversations between user 101 and the PDA on device 110. It will be appreciated that the present disclosure may readily accommodate other types of sensors and signals not explicitly listed hereinabove, and such other sensors and signals are contemplated to be within the scope of the present disclosure. For example, FIG. 10 illustrates an alternative exemplary embodiment of a smartphone device 1010 supporting a PDA, wherein Signal X3 is further provided indicating previous locations and times of the device 1010 as measured, e.g., by a GPS tracking unit on device 1010.

In an exemplary embodiment, certain intermediary entities (not shown in FIG. 1) may be provided to receive and process raw data generated by the sensors, so that they may be suitably used by the PDA to generate customized recommendations. An exemplary embodiment of such intermediary entities is further described hereinbelow, e.g., with reference to FIGS. 11A, 11B. For example, sensors such as Sensor 1 through Sensor N may individually communicate with one or more servers or data repositories, e.g., using independent wireless or wired connections, which in turn may communicate with the PDA. In an exemplary embodiment, signals such as Signal X1, X2 may also be communicated to such servers or data repositories using existing wireless or wired connections, e.g., a wireless cellular data connection (e.g., fourth-generation 4G or fifth-generation 5G wireless data connection) between device 110 and an Internet access server (not shown). In this Specification and in the Claims, the term "user data" may collectively denote data derived from any sensors or signals described hereinabove, which may provide information relevant to a user.

The inter-connection of all such sensors and signals with the Internet constitutes a network popularly known as the "Internet of Things" (or "IoT"), which promises to revolutionize the variety and depth of interactions between machines and human users. Due to the proliferation of IoT devices, users are continuously generating new data by interaction with the above-mentioned sensors. It is an object of the present invention to provide techniques to process such sensor data and/or other information sources indicative of user preferences to allow PDA's to customize recommendations to service users' interests and needs.

For example, as illustrated in FIG. 1, based on the sensor data and signals, device 110 may output a speech segment 110a to user 101 recommending an activity for the user, based on, e.g., the current local weather and/or knowledge of the user's tastes and favorite stores. Alternatively, smartphone device 1010 in FIG. 10 may output a speech segment 1010a to user 101 recommending an activity for the user further based on knowledge of the user's current position.

Figure 2:
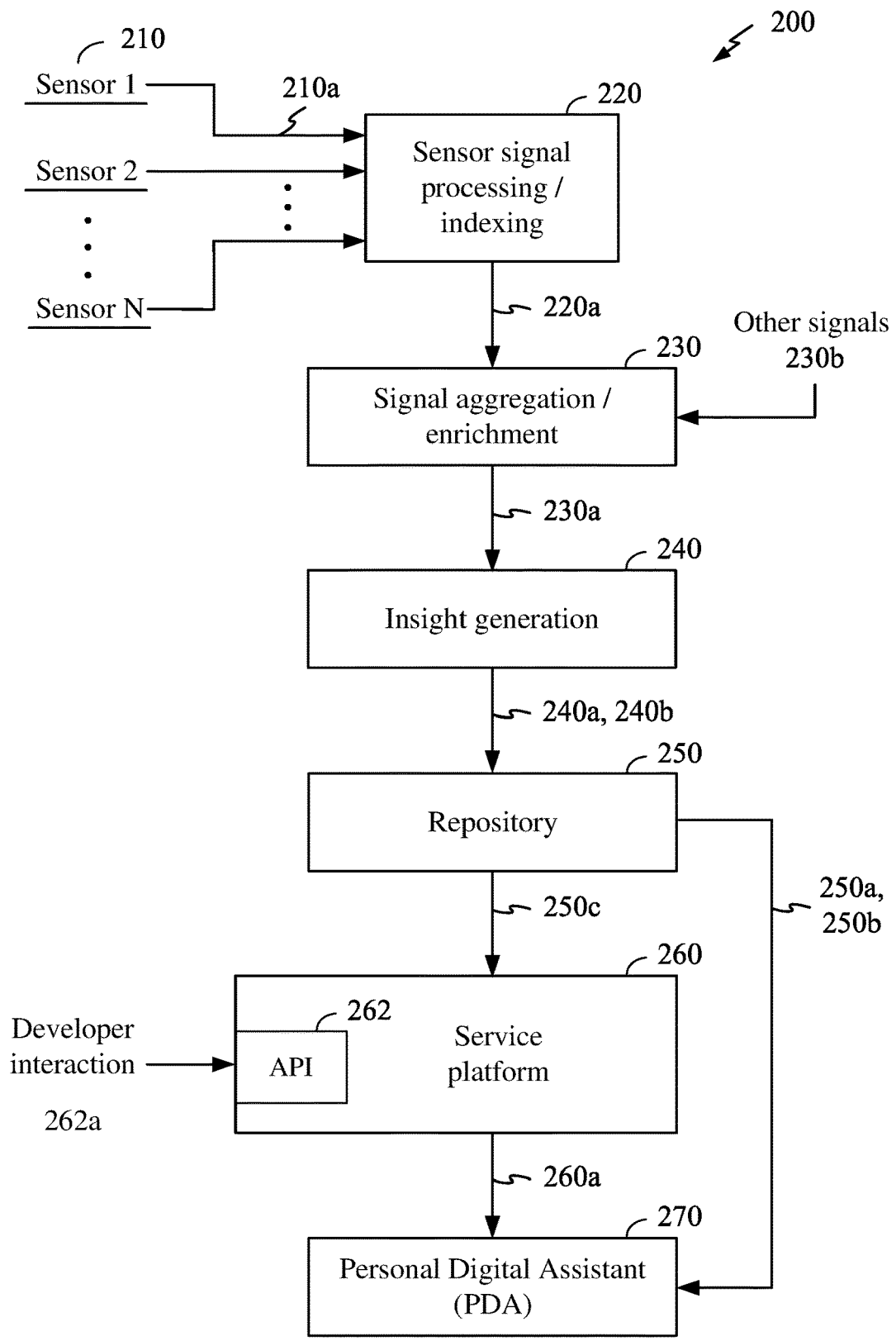
FIG. 2 illustrates an exemplary embodiment of a system for enabling a PDA to generate customized recommendations for users based on sensor data.

FIG. 2 illustrates an exemplary embodiment 200 of a system for enabling a PDA to generate customized recommendations for users based on sensor data. Note FIG. 2 is shown for illustrative purposes only, and is not meant to limit the scope of the present disclosure to any specific embodiments shown.

In FIG. 2. Sensor 1 through Sensor N (not necessarily corresponding to sensors shown in FIG. 1) are coupled to sensor signal processing/indexing module 220. In an exemplary embodiment, sensors may be operatively connected to module 220 via a communications network using respective wired or wireless connections, e.g., connections configured according to specifications for "fourth-generation" (4G) or "fifth generation" (5G) wireless protocols, and/or other wireless or wired standards or specifications.

Module 220 processes raw data 210a from each of Sensor 1 through Sensor N to generate processed sensor data 220a, which is processed and formatted to facilitate ready retrieval and utilization by subsequent blocks in system 200. In particular, processed sensor data 220a may include standard field identification tags such as sensor type (e.g., digital thermometer, automobile accelerometer, etc.), measured sensor values and/or measurement units, physical or geographical location where the sensor measurement was performed, time stamp, relevant user or sensor ID, etc. In an exemplary embodiment, data 220a may include multiple instances of data from a single sensor, e.g., measurements sampled periodically or aperiodically at different time instants. In an exemplary embodiment, processing and indexing of data 220a by module 220 may be performed by computer hardware, e.g., according to techniques such as described in U.S. patent application Ser. No. 15/908,342, entitled "Sensor Data Based Query Results," filed Feb. 28, 2018, assigned to the assignee of the present disclosure, the contents of which are hereby incorporated by reference in their entirety. An exemplary embodiment of a method for processing and indexing sensor data according to the present disclosure is further described with reference to FIGS. 11A, 11B hereinbelow. Note however that the present disclosure is not restricted to any particular techniques for processing and indexing sensor data described in FIGS. 11A, 11B, but it is contemplated that any suitable techniques for processing and indexing sensor data and signals will fall within the scope of the present disclosure.

Data 220a is provided to signal aggregation/enrichment module 230 to generate aggregated and enriched data 230a. In particular, module 230 may aggregate data from various sensors and signals corresponding to a specific user, including processed sensor data 220a related to the user, as well as other signals 230b. In an exemplary embodiment, other signals 230b may include, e.g., browsing history, search history, conversational or chat history, existing PDA inferences of user behavior or preferences, etc. Some instances of other signals 230b may be derived from sensor data 220a, e.g., they may include annotations of sensor data 230a, and/or interconnections among data 220a and instances of other signals 230b, e.g., as obtained from a knowledge engine or knowledge repository. In an exemplary embodiment, the knowledge repository may utilize the Bing Satori engine from Microsoft Corporation, wherein a large number of data entities and associated ontologies (e.g., identifying categories of the data and relationships among them) are cataloged and accessible online.

Data 230a is subsequently provided to insights engine 240, which extracts certain insights into a given user's preferences from the user's data 230a. In an exemplary embodiment, the insights extracted in this fashion include a "hybrid" mix of user patterns 240a and user profile parameters 240b.

In particular, patterns 240a characterize the temporal or spatial behavior, actions, or preferences of the user as surmised from data 230a, in a manner conducive to generating recommendations for that user. For example, patterns

240a may include a specification that, e.g., the user usually goes for morning walks from 6 AM to 7 AM daily. Other examples of patterns 240a may specify, e.g., that the user usually commutes to and from work by car during the time intervals 8:30-9 AM and 4:30-5 PM on weekdays, or that the user typically watches TV shows for 3 hours on weekdays and 6 hours on weekends, or that the user usually goes to sleep around 10 PM on weekdays and 11 PM on weekends, etc. In an exemplary embodiment, derivation of patterns 240a for the user may be implemented as further described hereinbelow with reference to FIG. 5.

Engine 240 may further derive user profile parameters 240b that characterize specific preferences of the user, including likes and dislikes, identity of friends, hobbies, etc. For example, profile parameters 240b may include a specification that the user likes to listen to classical music as a preferred music genre, likes to watch professional basketball or is a fan of a particular sports team, or enjoys reading mystery novels by certain authors, etc. In an exemplary embodiment, derivation of profile parameters 240b for the user may be implemented as further described hereinbelow with reference to FIG. 6.

In an exemplary embodiment, patterns 240a and profile parameters 240b generated by insights engine 240 are stored in repository 250, which may collect insights generated for a plurality of users in a single repository to facilitate the design of PDA service routines to generate custom recommendations based on the insights. Repository 250 makes stored insights (or "insights" hereinbelow) 250a, 250b, corresponding to stored versions of patterns 240a and profile parameters 240b, respectively, available to other blocks in the system.

Repository 250 is coupled to service routine platform 260. In an exemplary embodiment, platform 260 may be, e.g., a cloud server that accommodates and stores a variety of pre-programmed digital service routines (also denoted "service skills" or "plugins" herein) which utilize the stored insights 250a. 250b to generate specific user recommendations. In particular, a service routine receives insights 250a, 250b as input, and outputs a recommendation based on those insights.

For example, one such service routine (herein denoted "commuter music service routine") may specify that any user pattern 250a specifying "user commute to work by car" during a certain time interval may be combined with a user profile parameter 250b such as "user favorite music genre" to generate a programmed service routine to initiate playing the preferred genre of music through the car stereo during the specified commuting time intervals.

Note the commuter music service routine is described for illustrative purposes only, and is not meant to limit the scope of the present disclosure to any particular use of insights 250a, 250b. Other service routines may readily be derived in view of the present disclosure, e.g., service routines suggesting alarm settings based on detected wake-up patterns of the user, personalized fitness programs based on a user's profile and/or scheduling patterns, energy-saving tips for home appliances based on the user's daily activity patterns. TV shows to record based on user preferences, etc. Such alternative service routines and others not explicitly mentioned are contemplated to be within the scope of the present disclosure.

In an exemplary embodiment, platform 260 may store a plurality of such pre-programmed service routines, e.g., as designed and/or uploaded to platform 260 by service routine developers or other programming entities. In an exemplary embodiment, developers may specify service routines using an application programming interface (API) 262 of platform 260. API 262 may include, e.g., a standardized set of functions or routines that may be utilized by developers to specify and program digital service routines 260a referred to hereinabove. In particular, API 262 may make available to developers a non-user-specific schema 250c of insights 250a, 250b, e.g., function identifiers, property names, etc., for patterns 250a and profile parameters 250b.

PDA 270 may utilize any service routine 260a stored on platform 260 to generate customized user recommendations. In an exemplary embodiment, PDA 270 may specify or retrieve one or more service routines 260a from platform 260, and apply the routine on user-specific insights 250a, 250b to generate recommendations, as further described hereinbelow with reference to FIG. 4.

For example, insights 250a, 250b may include a user pattern 250a specifying that the specific user commutes to work by car between 7 am and 8 am on weekdays, and further user profile parameter 250b specifying that a favorite music genre of classical music. Per execution of a commuter music service routine 260a as described hereinabove, PDA 270 may accordingly configure classical music to be played on the user's car stereo between 7 am and 8 am on weekdays, with specific settings, e.g., sound settings including volume and reverb, etc., suitable to a car environment. Such settings may also be derived from user profile parameters 250b. Note the commuter music service routine is described for illustrative purposes only, and is not meant to limit the scope of the present disclosure to any particular types of routines, functionalities, preferences, etc., that may be accommodated by the techniques of this disclosure.

Figure 3:
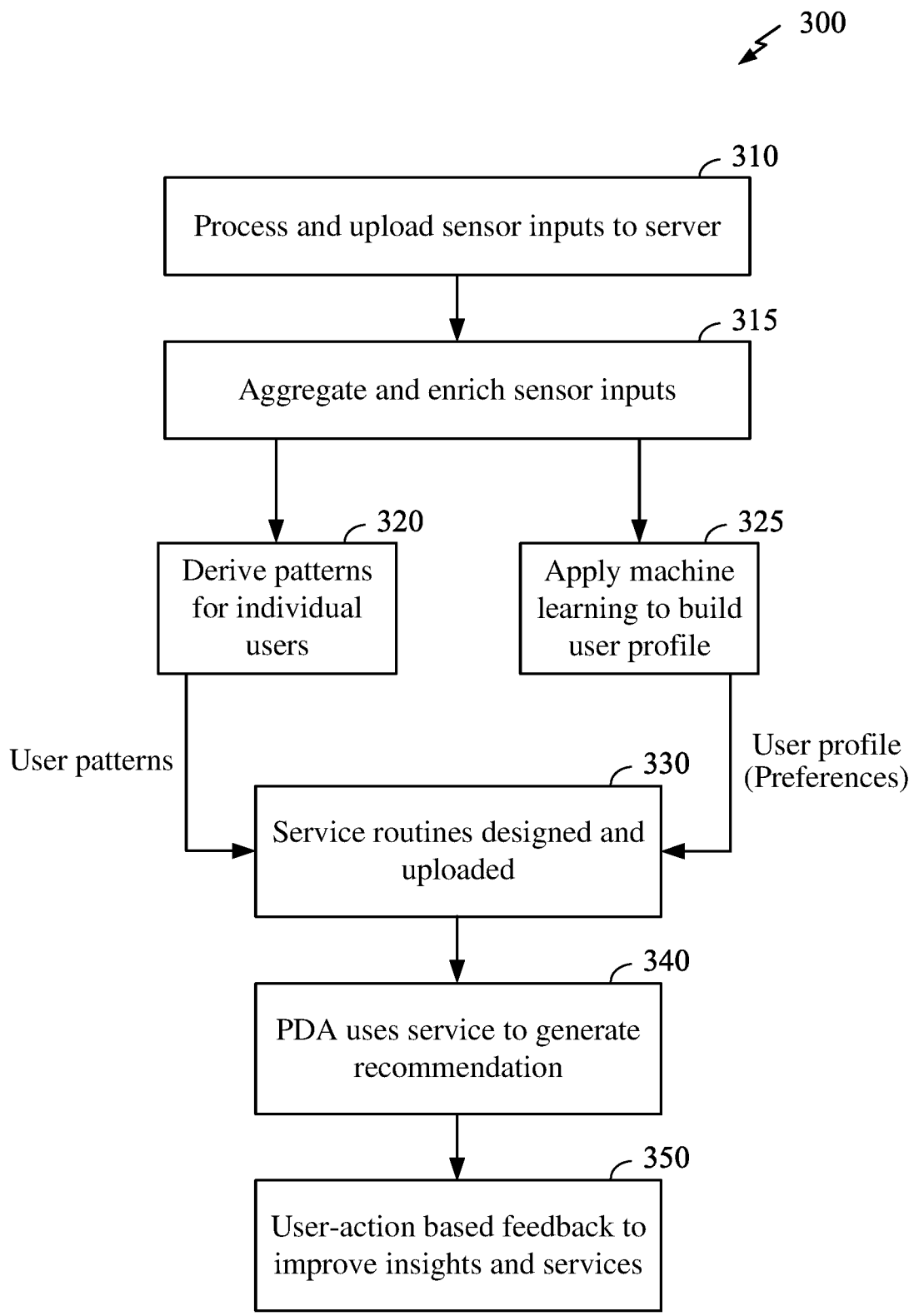
FIG. 3 illustrates an exemplary embodiment of a method utilizing the system to generate PDA recommendations for the user.

FIG. 3 illustrates an exemplary embodiment 300 of a method utilizing system 200 to generate PDA recommendations for the user. Note FIG. 3 is shown for illustrative purposes only, and is not meant to limit the scope of the present disclosure to any particular exemplary embodiments of methods shown.

In FIG. 3, at block 310, sensor inputs are processed and uploaded to a server. In an exemplary embodiment, sensor inputs may include, e.g., inputs from Sensor 1 through Sensor N shown in FIG. 2, and the server may correspond to, e.g., block 220 in FIG. 2.

At block 315, uploaded sensor inputs are aggregated and enriched. In an exemplary embodiment, aggregation and enrichment may be executed as described hereinabove with reference to block 230.

At block 320, patterns 240a are derived for individual users from the output of block 315.

At block 325, machine learning may be applied to extract parameters from the output of block 315 to build user profiles 240b.

In an exemplary embodiment, blocks 320 and 325 may proceed in parallel with each other. Insights, including patterns 240a and profile parameters 240b, may be stored in repository 250.

At block 330, service routines are designed and uploaded to service platform 260.

At block 340, the service routines are utilized by the PDA.

At block 350, feedback based on user action may be utilized to improve the generation of patterns 240a, profile parameters 240b, and/or service routines 260a For example, user acceptance of a recommendation generated by a service routine may be fed back to insights engine 240 to increase the confidence in an identified user pattern 240a or user profile parameter 240b. Conversely, user inaction responsive to generated recommendations may decrease confidence metrics corresponding to signals 240a, 240b. Alternatively, user clicks and read time per pixel responsive to generated recommendations may be logged, and fed back to insights engine 240. Such alternative exemplary embodiments are contemplated to be within the scope of the present disclosure.

Figure 4:
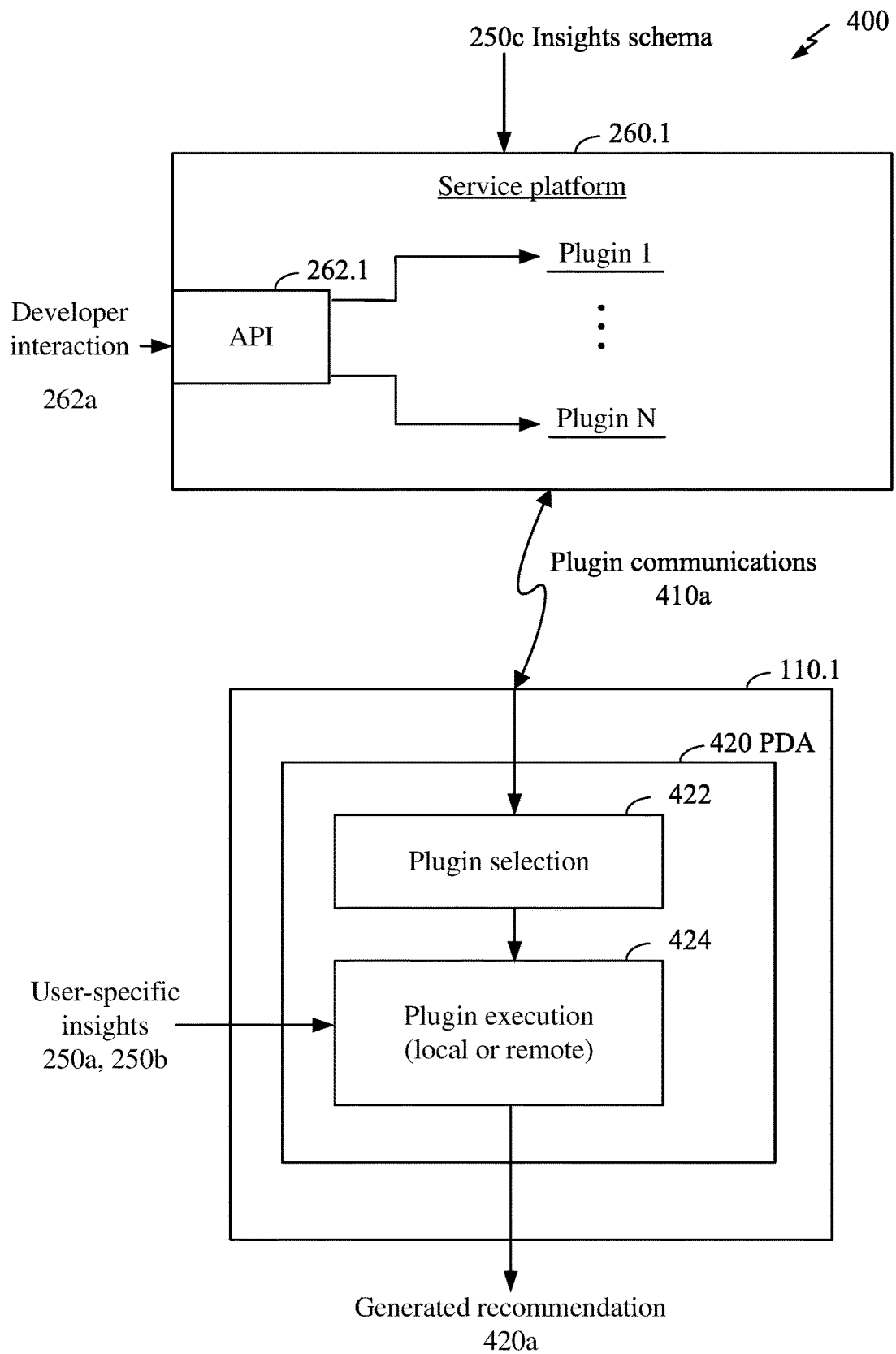
FIG. 4 illustrates an exemplary embodiment of an interface between the service platform and the PDA.

FIG. 4 illustrates an exemplary embodiment of an interface 400 between service platform 260 and the PDA. Note FIG. 4 is shown for illustrative purposes only, and is not meant to limit the scope of the present disclosure. In alternative exemplary embodiments, service routines may be created and provided using other mechanisms not explicitly shown in FIG. 4.

In FIG. 4, service platform 260.1 receives insights schema 250*c* from repository 250. As described hereinabove, schema 250*c* specifies a standardized format for insights 250*a*, 250*b* from repository 250, such that developers can access and retrieve the insights when designing service routines. It will be appreciated that service platform 260.1 may correspond to, e.g., a network server, a cloud server or cloud computing service such as Microsoft Azure, or any generally computing hardware that can receive and store digital service routines for later retrieval.

Service platform 260.1 supports an API 262.1 based on schema 250*c*, such that developers may create service routines or plugins using insights 250*a*. 250*b*. Developer interaction 410*a* through API 262.1 with service platform 260.1 generates a plurality of service routines or plugins, labeled Plugin 1 through Plugin N, which are stored on the platform. Each plugin corresponds to a service routine, e.g., the commuter music service routine described hereinabove, that may be accessed and utilized by a PDA to generate user-specific recommendations.

FIG. 4 further illustrates an exemplary embodiment of device 110.1 supporting PDA 420 that utilizes the service routines stored on service platform 260.1. In particular, PDA 420 includes a plugin selection module 422, which allows selection of which service routines will be utilized by PDA 420 to generate recommendations for the user. In an exemplary embodiment, the user may explicitly select his or her preferred service routines for execution. In an alternative exemplary embodiment, PDA 420 may, with user consent, automatically select certain service routines for execution.

Based on the selections, device 110.1 may be in communication 410*a* with service platform 260.1 to access the one or more selected plugins stored on the service platform. In an exemplary embodiment, communication 410*a* may include, e.g., network communication whereby software code for selected plugins are downloaded to local memory of device 110.1, and locally stored for subsequent execution. This manner of plugin execution is also denoted "local execution" herein.

In alternative exemplary embodiments, Plugin 1 through Plugin N may be hosted on service platform 260.1 and each published as a web endpoint, such that device input-output mapping of each plugin may be directly executed by service platform 260.1. In this case, communications 410*a* may include transmission of user-specific inputs to service platform 260.1, and receiving the recommendation(s) generated by the selected plugins based on the transmitted inputs. This manner of execution is also denoted "remote execution" herein. Alternative techniques for communication 410*a* between device 110.1 and service platform 260.1 will be clear to one of ordinary skill in the art in view of the present disclosure, and such alternative techniques are contemplated to be within the scope of the present disclosure.

PDA 420 further includes plugin execution block 424, which executes (either locally or remotely) the plugins by supplying insights 250*a*, 250*b* as inputs to the selected plugin(s), and receiving output from the plugin in the form of generated recommendation(s) 420*a*.

Figure 5:
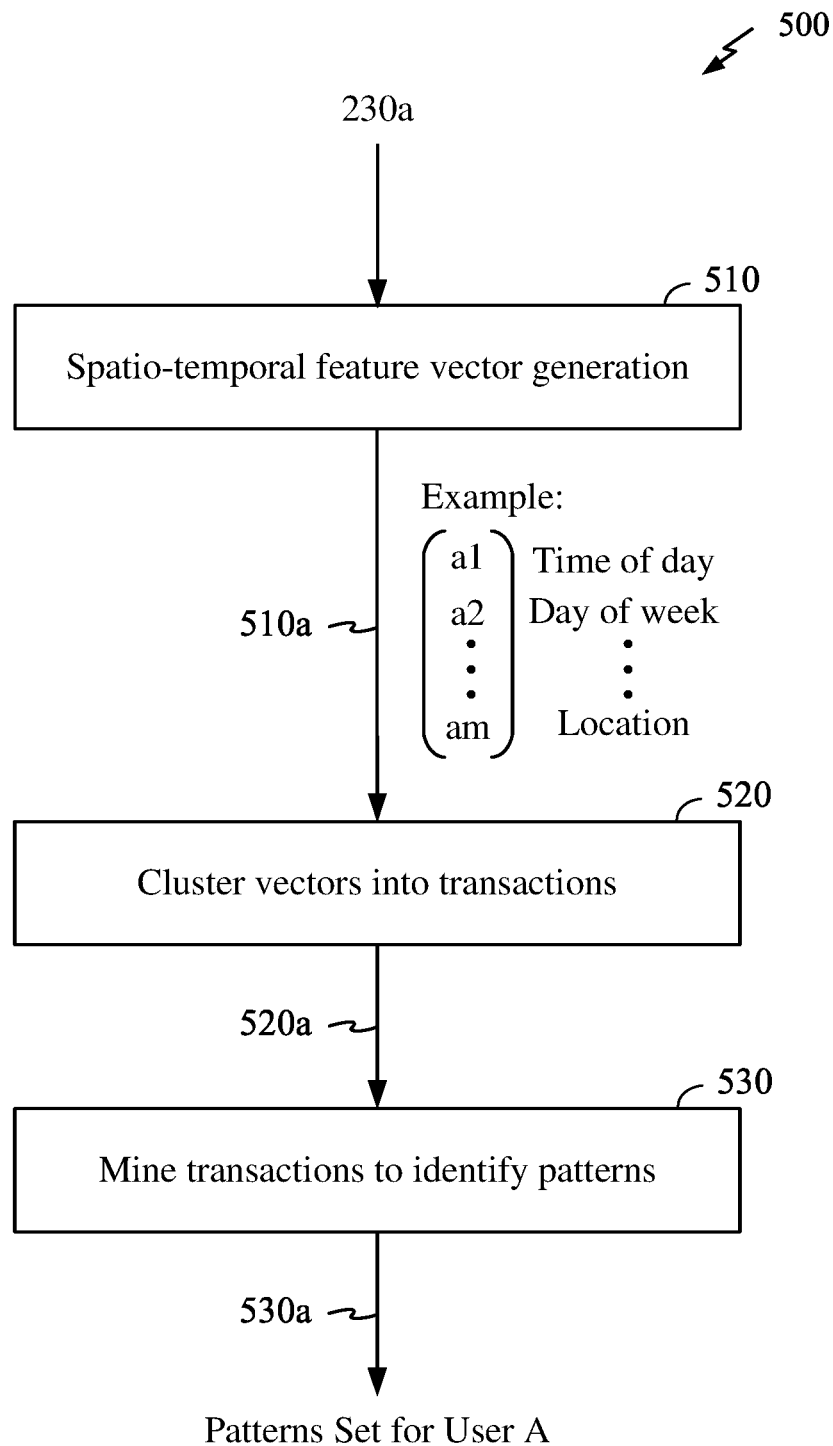
FIG. 5 illustrates an exemplary embodiment of operations performed by the insights engine to extract user patterns from user data.

FIG. 5 illustrates an exemplary embodiment of operations 500 performed by insights engine 240 to extract user patterns 240*a* from user data. Note FIG. 5 is shown for illustrative purposes only, and is not meant to limit the scope of the present disclosure to any particular techniques for generating user patterns shown.

In FIG. 5, at block 510, each instance of data 230*a* is projected onto a predetermined set of dimensions (herein "dimension set") to generate a "spatio-temporal" feature vector 510*a*. In an exemplary embodiment, the set of dimensions may include dimensions selectively chosen from the following: 1) signal identity (e.g., usage of a particular device, turning on/off of particular switches such as lights or appliances, etc.), 2) day of month, 3) day of week, 4) time of day, 5) location, and 6) duration of usage.

In an exemplary embodiment, the data value in a dimension may be assigned to one of a plurality of "coarse" categories, e.g., to limit the number of possible values in each dimension. For example, a feature vector may contain the time of day dimension expressed as one of, e.g., "early morning," "late morning," or "early afternoon," etc., rather than as a full-precision time stamp format in which the raw data may be generally available from the sensor. It will be appreciated that such assignment to coarse categories may facilitate clustering of feature vectors by similarity along certain dimensions.

At block 520, feature vectors 510*a* may be merged or "clustered" into distinct groups of "transactions," based on mutual closeness as quantified by one or more distance metrics. In particular, a transaction may group together all feature vectors adjudged to convey a similar type of information. For example, a "morning commute" transaction may contain a first set of feature vectors that all encapsulate GPS coordinates or other location signals indicating travel along the same geographical route during weekday mornings. In this example, the first set of feature vectors may be identified from amongst all feature vectors using a first distance metric that is based on values from the geographical location, time of day, and day of week dimensions of each feature vector. For example, all feature vectors that are less than a predetermined threshold distance from each other may be clustered into the morning commute transaction, wherein the distance is measured using the first distance metric. Block 520 thus generates a plurality of transaction clusters 520*a* each cluster including one or more feature vectors grouped together by closeness of at least one distance metric.

At block 530, the transactions are mined to identify patterns. In an exemplary embodiment, a "confidence" metric is further evaluated for each transaction cluster, to assess whether there is enough confidence to identify the cluster as constituting a significant user "pattern." In particular, the confidence assessment may be made by considering the number of feature vectors in each transaction cluster, e.g., under the assumption that more instances of data in a cluster generally increase confidence in the cluster. In an exemplary embodiment, the statistics of the relative distance metrics in the cluster may also be considered, e.g., smaller mean distances of vectors from each other may indicate greater confidence, etc. If there is sufficient confidence in a cluster, e.g., if a computed confidence metric based on the above considerations exceeds a predetermined threshold, then the cluster may be identified as a user pattern 530*a*. The set of all patterns 530*a* for a user is denoted the user's "patterns set."

Figure 6:
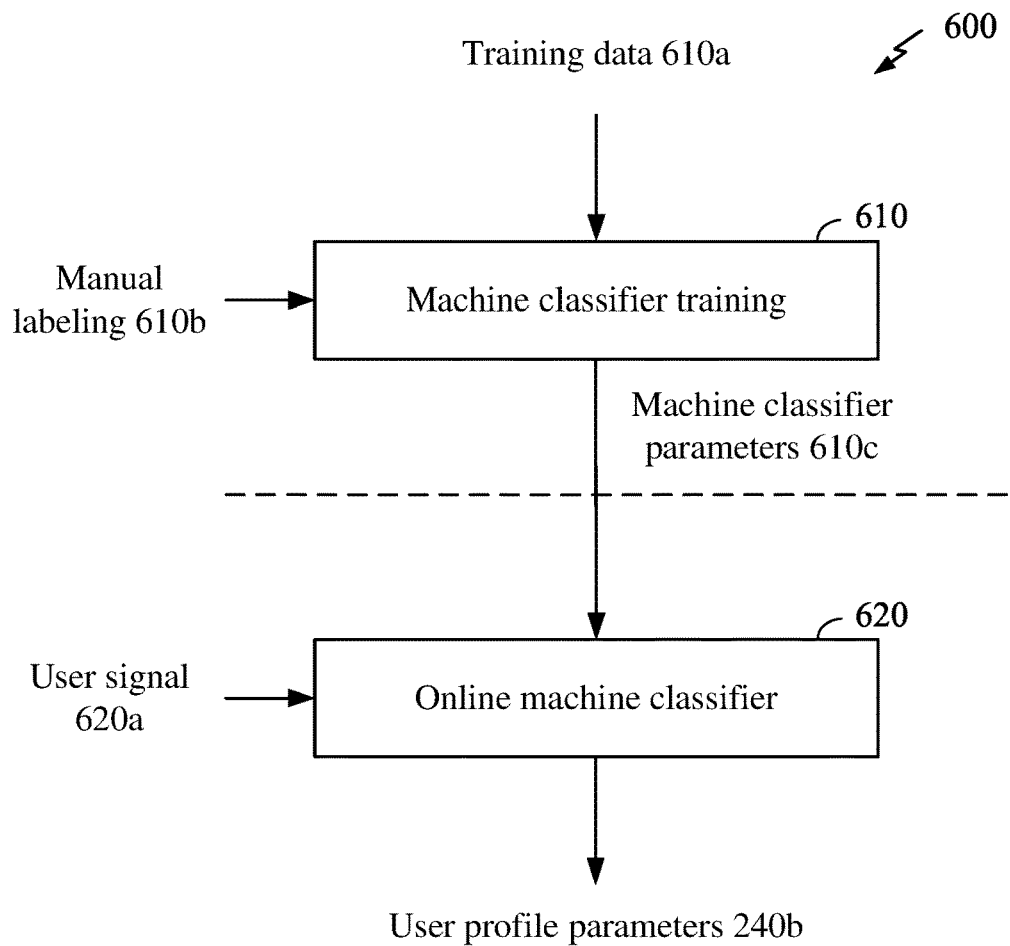
FIG. 6 illustrates an exemplary embodiment of operations performed by insights engine to extract user profile parameters from user data.

FIG. 6 illustrates an exemplary embodiment of operations 600 performed by insights engine 240 to extract user profile parameters 240b from user data. Note FIG. 6 is shown for illustrative purposes only, and is not meant to limit the scope of the present disclosure to any particular techniques for generating user profile parameters shown.

In FIG. 6, a machine classifier 610 is trained to classify user data into one or more manually labeled category types. In particular, each category type provides insight into a user's preferences that may subsequently utilized to make recommendations to the user. For example, a signal indicating that the user downloaded an audio recording of the Beethoven "Moonlight" sonata may suggest a "classical music preference" be assigned to the user profile.

In an exemplary embodiment, the user data to be classified may include any or all of data 210a. 220a, 230a, as described hereinabove with reference to FIG. 2. To train machine classifier 610, training data from other sources may also be used, and such alternative exemplary embodiments are contemplated to be within the present disclosure.

In an exemplary embodiment, a corpus of training data 610a (e.g., taken from many users) may be manually labelled using labels 610b assigned by human judges. To train machine classifier 610, any techniques known in the art of machine learning may be used, e.g., support vector machines (SVM), decision trees, etc. Upon completion of training, a set of learned classifier parameters 610c is provided to an online machine classifier 620.

At block 620, the learned parameters 610c are utilized by classifier 620 to provide online classification of user signals 620a, generating user profile parameters 240b. In an exemplary embodiment, user signals 620a may include any of the signals 210a. 220a, 230a described with reference to FIG. 2.

Figure 7:
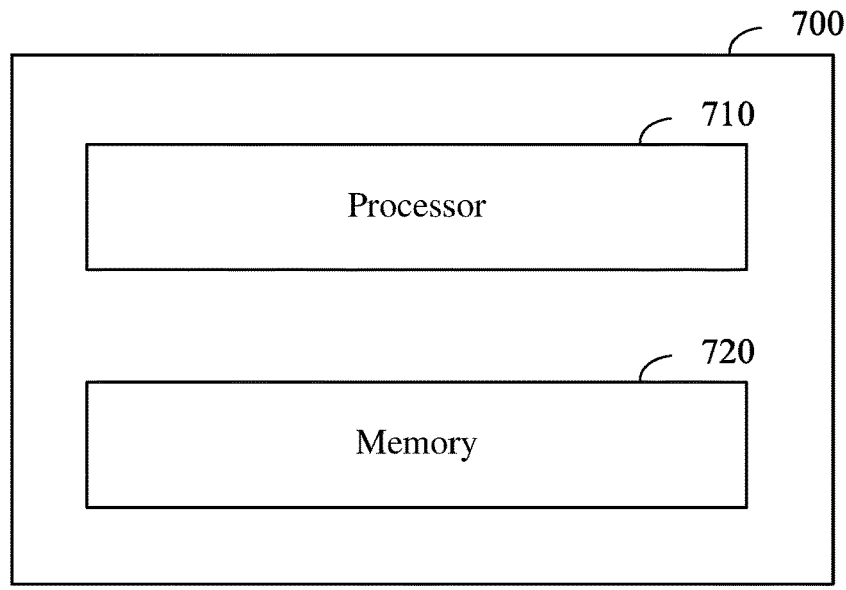
FIG. 7 illustrates an exemplary embodiment of an apparatus according to the present disclosure.

FIG. 7 illustrates an exemplary embodiment of an apparatus 700 comprising a processor 710 and a memory 720 storing instructions executable by the processor to cause the processor to: extract at least one user pattern from a plurality of sensor inputs and signals; generate at least one user profile parameter from the plurality of sensor inputs and signals; and transmit the at least one user pattern and the at least one user profile parameter to a personal digital assistant (PDA) to enable the PDA to generate a user recommendation.

Figure 8:
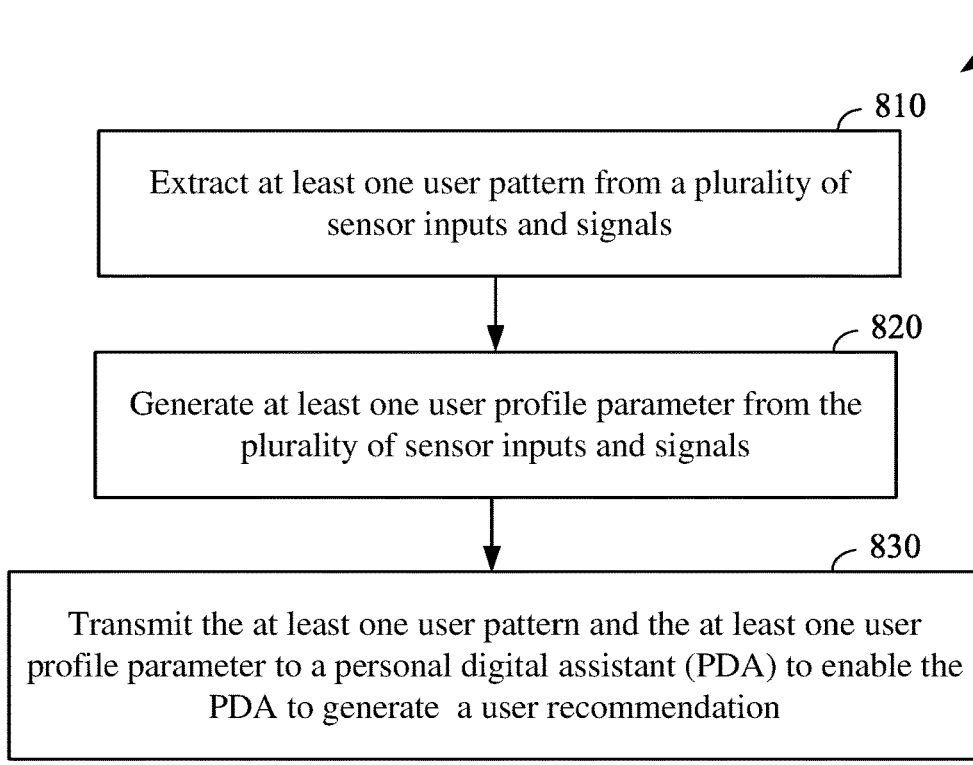
FIG. 8 illustrates an exemplary embodiment of a method according to the present disclosure.

FIG. 8 illustrates an exemplary embodiment of a method 800 comprising: extracting 810 at least one user pattern from a plurality of sensor inputs and signals; generating 820 at least one user profile parameter from the plurality of sensor inputs and signals; and transmitting 830 the at least one user pattern and the at least one user profile parameter to a personal digital assistant (PDA) to enable the PDA to generate a user recommendation.

Figure 9:
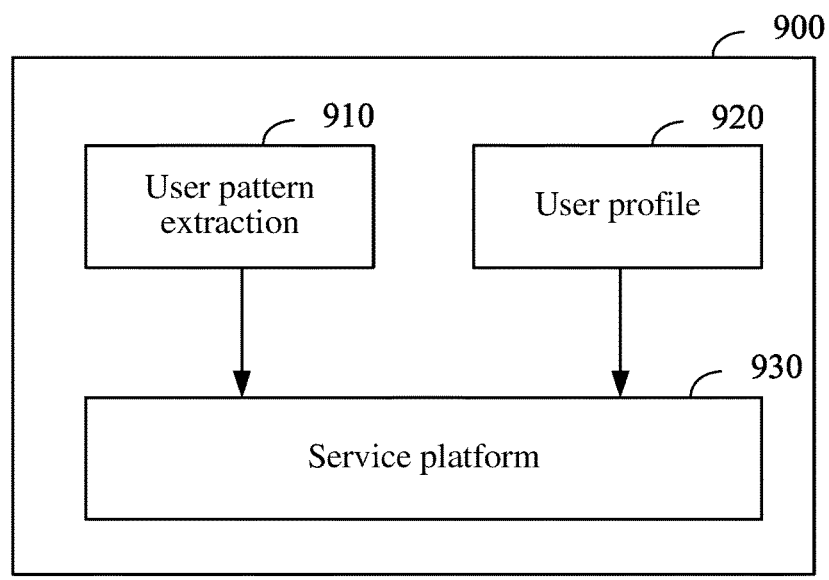
FIG. 9 illustrates an alternative exemplary embodiment of an apparatus according to the present disclosure.

FIG. 9 illustrates an exemplary embodiment of an apparatus 900 comprising: a user pattern extraction block 910 configured to identify at least one user pattern from a plurality of sensor inputs and signals; a user profile block 920 configured to generate at least one user profile parameter from the plurality of sensor inputs and signals; and a service platform 930 storing at least one service routine configured to combine the at least one user pattern with the at least one user profile parameter to generate a user recommendation for a personal digital assistant.

Figure 11A:
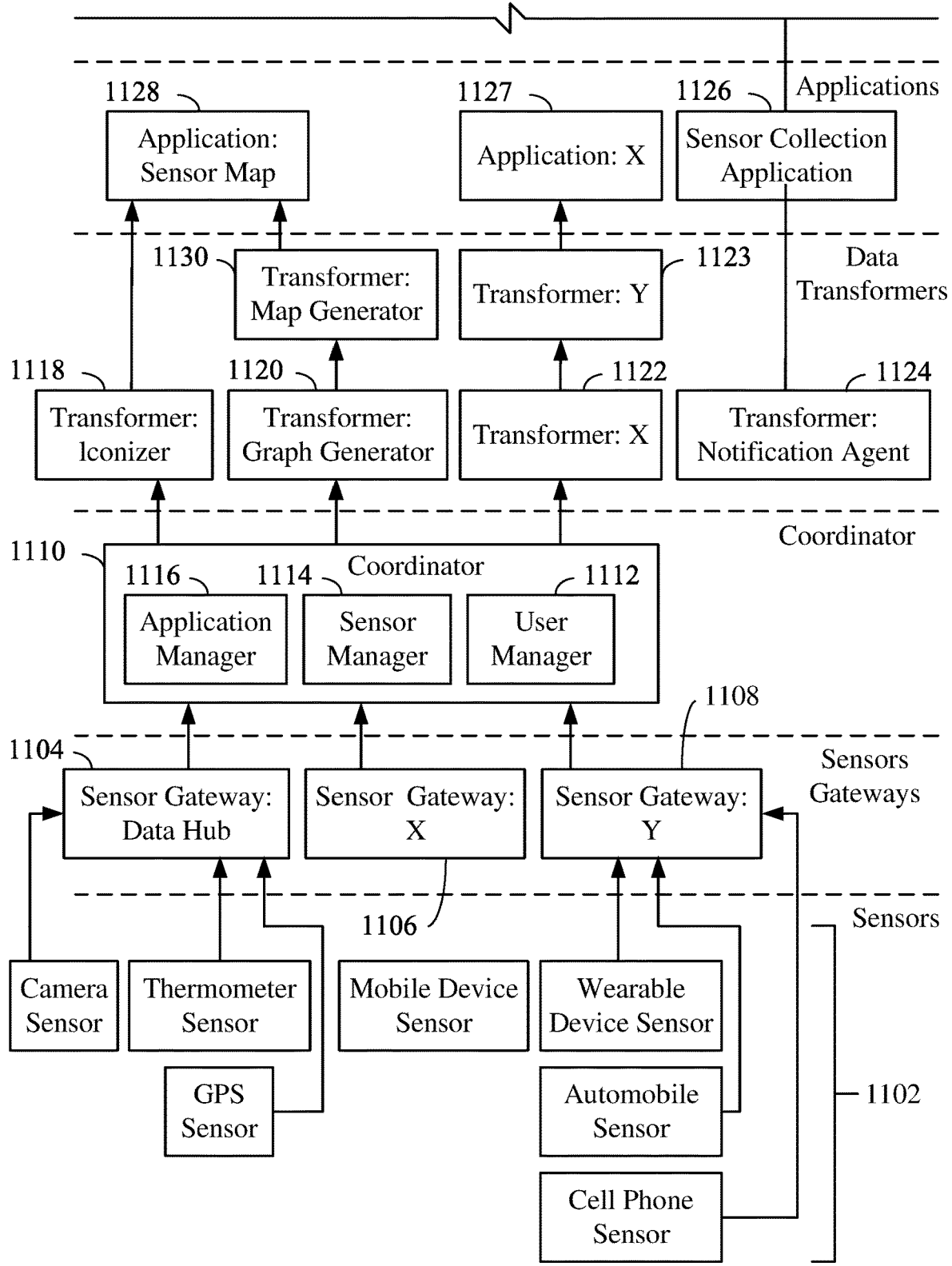
FIGS. 11A, 11B illustrate an exemplary embodiment of a data flow in a system for receiving, processing, and indexing sensor data according to the present disclosure.
Figure 11B:
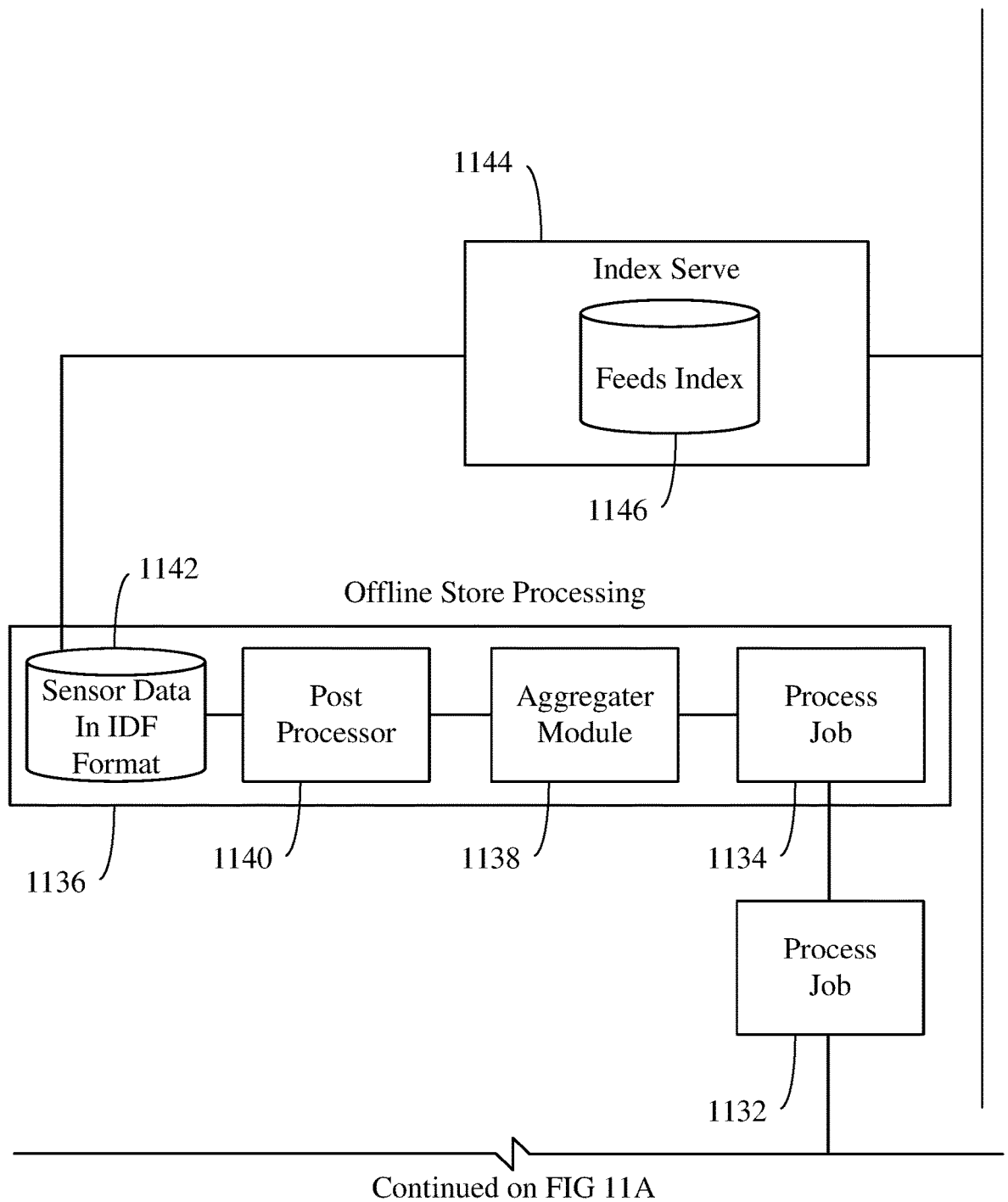

FIGS. 11A, 11B illustrate an exemplary embodiment of a data flow in a system for receiving, processing, and indexing sensor data according to the present disclosure. Note FIGS. 11A, 11B are shown for illustrative purposes only, and are not meant to limit the scope of the present disclosure to any particular data flows for receiving, processing, and indexing sensor data shown.

In FIG. 11A, the system 1100 can include any number of sensors 1102 such as a camera, a thermometer, an accelerometer, a mobile device sensor, a pedometer, an automobile based sensor, a robot based sensor, and the like. In some examples, the sensors 1102 can transmit sensor data to sensor gateways 1104, 1106, and 1108. The sensor gateways 1104, 1106, and 1108 can provide a uniform interface between the sensors 1102 and a coordinator 1110. For example, the sensor gateways 1104, 1106, and 1108 can normalize sensor data detected from sensors built using many different platforms widely varying in processing power, energy, and bandwidth capabilities. In some examples, the sensors 1102 can have different access interfaces such as radios to communicate with low powered wireless sensor nodes or serial buses for high-speed communications and isochronous data transfer with higher power and higher bandwidth sensors. In some examples, the sensors 1102 may not be connected at all times to the sensor gateways 1104, 1106, and 1108. The sensor gateways 1104, 1106, and 1108 can implement sensor specific techniques to communicate with each sensor 1102.

In some embodiments, the coordinator 1110 can access the sensor gateways 1104, 1106, and 1108 to obtain sensor data streams, to submit data collection demands, or access sensor characteristics through a standardized web service application programming interface (API). In some examples, each sensor 1102 may maintain a separate sensor gateway 1106. In some embodiments, the sensor gateways 1104, 1106, and 1108 can implement sharing policies defined by a contributor. For example, the sensor gateways 1104, 1106, and 1108 can maintain raw data in a local database for local applications executed by a sensor 1102, which can maintain private data while transmitting non-private data to the coordinator 1110. In some embodiments, a datahub sensor gateway 1104 can be used by sensors 1102 that do not maintain their own sensor gateway. In some examples, individual sensors can publish their data to a datahub sensor gateway 1104 through a web service API.

In some embodiments, the coordinator 1110 can be a point of access into the system 1100 for applications and sensors 1102. The coordinator 1110 can include a user manager 1112, a sensor manager 1114, and an application manager 1116. The user manager 1112 can implement user authentication mechanisms. In some embodiments, the sensor manager 1114 can provide an index of available sensors 1102 and the characteristics of the sensors 1102. For example, the sensor manager 1114 can convert user friendly sensor descriptions, such as location boundaries, logical names, or sensor types, to physical sensor identifiers. The sensor manager 1114 can also include APIs for sensor gateways 1104, 1106, and 1108 to manipulate sensors 1102 and the type of sensors 1102. For example, the sensor manager 1114 can define new sensor types, register new sensors of defined types, modify characteristics of registered sensors, and delete registered sensors.

In some embodiments, the application manager 1116 can be an access point to shared data for additional components in the system 1100. In some examples, the application manager 1116 can manage the sensor gateways 1104, 1106, and 1108. The application manager 1116 can also accept sensing queries from additional components and satisfy the sensing queries based on available sensors 1102. In some embodiments, to minimize a load on the sensors 1102 or the respective sensor gateways 1104, 1106, and 1108, the application manager 1116 can attempt to combine the requests for common data. The application manager 1116 can also cache recently accessed sensor data so that future queries without stringent real-time requirements can be served by local caches.

In some embodiments, the coordinator 1110 can transmit data to data transformers 1118, 1120, 1122, 1123, and 1124. The data transformers 1118, 1120, 1122, 1123, and 1124 can convert data semantics through processing. For example, a data transformer 1118-1124 can extract the people count from a video stream, perform unit conversion, perform data fusion, and implement data visualization services. In some examples, transformers 1118-1124 can perform different tasks. For example, an iconizer data transformer 1118 can convert raw sensor readings into an icon that represents a sensor type in the icon's shape and sensor value in the icon's color. In some examples, graphical applications can use the output of the iconizer data transformer 1118 instead of raw sensor values. In another example, a graph generator data transformer 1120 can obtain raw sensor readings and generate 2D spatial graphs. In some embodiments, a notification agent 1124 can determine when to transmit sensor data to a sensor collection application 1126.

In some examples, applications utilize sensor data for executing instructions. The applications 1126, 1127, and 1128 can be interactive applications where users specify data needs such as user queries for average hiker heart rate over the last season on a particular trail, among others. The applications 1126, 1127, and 1128 can also include automated applications in backend enterprise systems that access sensor streams for business processing, such as an inventory management application that accesses shopper volume from parking counters, customer behaviors from video streams, and correlates them with sales records. In one example, a sensor map application 1128 can visualize sensor data from the iconizer transformer 1118 and a map generator transformer 1130 on top of a map representation of a location.

In some embodiments, the sensor collection application 1126 can collect sensor data from any number of the sensors 1102 and transmit the sensor data to an intermediate store 1132. In some examples, the sensor collection application 1126 can implement a policy to collect sensor data that deviates from a previous value by more than a predetermined threshold. For example, the sensor collection application 1126 may store sensor data from a thermometer sensor if a value is at least a certain number of degrees above or below a previously detected value. If the sensor collection application 1126 detects sensor data below a predetermined threshold, the sensor collection application 1126 can discard or delete the sensor data. Accordingly, the sensor collection application 1126 can limit a size of sensor data collected from each sensor 1102 and transmitted for storage in the intermediate store 1132 of FIG. 11B.

In some embodiments, the predetermined threshold can be different for each sensor 1102. For example, the predetermined threshold can indicate that a number of steps from a pedometer that exceeds a previously detected value are to be stored in the intermediate store 1132. In another example, the predetermined threshold can indicate that location data from a global positioning system sensor is to be stored if a new location is more than a predetermined distance from a previously detected value. In yet another example, the predetermined threshold can indicate that a number of users detected in a video frame or image is to be stored if an increase or decrease from a previously detected value exceeds a threshold value. Accordingly, the intermediate store 1132 can store the sensor data that exceeds the predetermined threshold detected from any suitable number of sensors. The smaller sensor data set stored in the intermediate store 1132 can enable faster analysis and limit storage requirements for the system 1100. In some examples, the smaller sensor data set can enable the intermediate store 1132 to store data from a larger number of sensors 1102.

In some examples, a process job 1134 can retrieve the sensor data stored in the intermediate store 1132 as part of offline store processing 1136. The process job 1134 can transmit the retrieved sensor data to an aggregator module 1138 that can aggregate sensor data based on time information. For example, sensor data from sensors 1102 stored in the intermediate store 1132 can be aggregated based on a common time frame during which the sensor data was collected. In some embodiments, the aggregator module 1138 can aggregate sensor data based on any suitable fixed or variable period of time. For example, sensor data from sensors 1102 can be aggregated within larger time periods during particular hours of a day or during particular days of a week. In some examples, the aggregator module 1138 can aggregate sensor data with smaller time periods during daytime hours when a larger amount of sensor data is collected and aggregate sensor data with larger time periods during nighttime hours when a smaller amount of sensor data is collected.

In some embodiments, the aggregator module 1138 can transmit the aggregated sensor data to a post processor 1140. In some examples, the post processor 1140 can transform the sensor data aggregated based on time periods into an indexable data format (IDF) 1142. The IDF data can enable search of and access to the aggregated search data in a shorter period of time.

In some embodiments, the IDF data 1142 can be transmitted to an index serve 1144 that includes a feeds index 1146. The feeds index 1146 can include a lookup table, wherein data is stored in a <key, value> format. In some examples, the feeds index 1146 can create multiple lookup <key, value> pairs based on sensor data. In some embodiments, the index serve 1144 can retrieve a generated IDF data file 1142 and process the IDF data file 1142 into content chunks that are incorporated into a feeds index 1146. In some examples, an index as a service (IaaS) environment can retrieve or stream the content chunks generated by the feeds index 1146 as the content chunks become available. In some examples, the index serve 1144 periodically initiates a merge process. During an index merge on the feeds index 1146, the index chunk files are combined into a new complete version of the index.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Furthermore, when an element is referred to as being "electrically coupled" to another element, it denotes that a path of low resistance is present between such elements, while when an element is referred to as being simply "coupled" to another element, there may or may not be a path of low resistance between such elements.

The functionality described herein can be performed, at least in part, by one or more hardware and/or software logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

The invention claimed is:

1. A method comprising:
    receiving, from a plurality of sensor gateways, normalized sensor data that has been converted from different communication interfaces of diverse sensor platforms into a format supported by an interface between the sensor gateways and a coordinator of sensor inputs and signals;
    extracting at least one user pattern from a plurality of sensor inputs and signals, the extracting comprising:
        for at least one of the plurality of sensor inputs and signals, generating a feature vector from the at least one of the plurality of sensor inputs and signals,
        clustering feature vectors into at least one transaction cluster based on closeness of the feature vectors, and
        identifying a transaction cluster as a user pattern if a corresponding confidence metric exceeds a predetermined threshold;
    generating at least one user profile parameter from the plurality of sensor inputs and signals; and
    transmitting the at least one user pattern and the at least one user profile parameter to a digital assistant to enable the digital assistant to generate a user recommendation.

2. The method of claim 1, the feature vector comprising at least one dimension selected from the group consisting of: day of month, day of week, time of day, location, and duration of usage.

3. The method of claim 2, a value of the feature vector corresponding to the at least one dimension being assigned to a coarse category.

4. The method of claim 1, the generating the at least one user profile parameter comprising utilizing a machine learning algorithm, wherein the machine learning algorithm is trained using a corpus of manually labeled sensor inputs and signals.

5. The method of claim 4, the machine learning algorithm comprising a support vector machine.

6. The method of claim 1, further comprising aggregating inputs from a plurality of connected sensors to generate the plurality of sensor inputs and signals.

7. The method of claim 6, further comprising enriching the aggregated inputs using ontologies derived from a knowledge repository to generate the plurality of sensor inputs and signals.

8. The method of claim 1, further comprising transmitting at least one service routine to a wireless communication device implementing the digital assistant.

9. The method of claim 1, the extracting further comprising modifying the at least one user pattern based on user feedback received from the digital assistant.

10. The method of claim 1, further comprising generating at least one insight corresponding to versions of stored user patterns and user profile parameters.

11. An apparatus comprising:
    a user pattern extraction block configured to:
        identify at least one user pattern from a plurality of sensor inputs and signals,
        for at least one of the plurality of sensor inputs and signals, generate a feature vector from the at least one of the plurality of sensor inputs and signals,
        cluster feature vectors into at least one transaction cluster based on closeness of the feature vectors, and
        identify a transaction cluster as a user pattern if a corresponding confidence metric exceeds a predetermined threshold;
    a user profile block configured to generate at least one user profile parameter from the plurality of sensor inputs and signals; and
    a service platform storing at least one service routine configured to combine the at least one user pattern with the at least one user profile parameter to generate a user recommendation for a digital assistant,
    wherein the plurality of sensor inputs and signals originate from a diverse group of individual devices having different communication interfaces, the diverse group of individual devices comprising:
        at least one individual device built on a platform that is different from one or more other individual devices of the diverse group,
        at least one individual device that communicates sensor data via an access interface that is different from one or more other individual devices of the diverse group, and
        at least one individual device that communicates sensor data that is private sensor data, wherein privacy of the private sensor data remains private from one or more other individual devices of the diverse group.

12. The apparatus of claim 11, the feature vector comprising at least one dimension selected from the group consisting of: day of month, day of week, time of day, location, and duration of usage.

13. The apparatus of claim 12, a value of the feature vector corresponding to the at least one dimension being assigned to a coarse category.

14. The apparatus of claim 11, the user profile block comprising machine parameters derived from a machine learning algorithm, wherein the machine learning algorithm is trained using a corpus of manually labeled sensor inputs and signals.

15. The apparatus of claim 14, the machine learning algorithm comprising a support vector machine.

16. The apparatus of claim 11, further comprising a signal aggregation and enrichment block configured to aggregate inputs from the diverse group of individual devices to generate the plurality of sensor inputs and signals.

17. The apparatus of claim 16, the signal aggregation and enrichment block further configured to enrich the aggregated inputs using ontologies derived from a knowledge repository to generate the plurality of sensor inputs and signals.

18. The apparatus of claim 11, wherein the service platform stores at least one service routine configured to generate at least one insight corresponding to versions of stored user patterns and user profile parameters.

19. An apparatus comprising a processor and a memory storing instructions executable by the processor to cause the processor to:
    receive, from a plurality of sensor gateways, normalized sensor data that has been converted from different communication interfaces of diverse sensor platforms into a format supported by an interface between the sensor gateways and a coordinator of sensor inputs and signals;

extract at least one user pattern from a plurality of sensor inputs and signals, wherein the processor extracts by:
for at least one of the plurality of sensor inputs and signals, generating a feature vector from the at least one of the plurality of sensor inputs and signals;
clustering feature vectors into at least one transaction cluster based on closeness of the feature vectors; and
identifying a transaction cluster as a user pattern if a corresponding confidence metric exceeds a predetermined threshold;
generate at least one user profile parameter from the plurality of sensor inputs and signals; and
transmit the at least one user pattern and the at least one user profile parameter to a digital assistant to enable the digital assistant to generate a user recommendation.

20. The apparatus of claim 19, the memory further storing instructions executable by the processor to cause the processor to generate at least one insight corresponding to versions of stored user patterns and user profile parameters.

* * * * *